United States Patent
Sugiyama

[19]

[11] Patent Number: 6,008,835
[45] Date of Patent: Dec. 28, 1999

[54] IMAGE FORMING DEVICE UTILIZING LASER BEAM

[75] Inventor: Hiroki Sugiyama, Mishima, Japan

[73] Assignee: Ricoh Company, Ltd., Tokyo, Japan

[21] Appl. No.: 08/736,061

[22] Filed: Oct. 22, 1996

[30] Foreign Application Priority Data

Oct. 30, 1995 [JP] Japan ................................. 7-305104

[51] Int. Cl.⁶ .................................................. B41J 2/47
[52] U.S. Cl. ......................... 347/256; 347/241; 347/253
[58] Field of Search .................................. 347/246, 252, 347/256, 253, 241, 250

[56] References Cited

U.S. PATENT DOCUMENTS

| | | | |
|---|---|---|---|
| 4,605,606 | 8/1986 | Ferrante | 350/33 |
| 4,922,266 | 5/1990 | Bidner et al. | 347/250 |
| 5,021,807 | 6/1991 | Kinoshita | 347/253 |
| 5,151,586 | 9/1992 | Sato et al. | 347/246 |
| 5,391,449 | 2/1995 | Maruyama et al. | 430/66 |
| 5,436,644 | 7/1995 | Motoi et al. | 347/256 |

*Primary Examiner*—N. Le
*Assistant Examiner*—Thinh Nguyen
*Attorney, Agent, or Firm*—Oblon, Spivak, McClelland, Maier & Neustadt, P.C.

[57] ABSTRACT

An image forming device wherein a Gaussian laser beam is scanned imagewise on a photosensitive recording medium by an image forming optical system including an optical filter having such a laser beam filtering pattern that the optical transmittance is a minimum value M of 40–60% at the center thereof and gradually increases from the center in the radially outward direction in a Gaussian distribution mode. The filter has a filtering radius $R_f$ which is a distance between the center and a point on the filter providing a transmittance equal to $100-(100-M)/e^2\%$ and which is not smaller than $0.9\ R_b$ but not greater than $1.1\ R_b$ where $R_b$ is a beam radius of the Gaussian laser beam.

6 Claims, 5 Drawing Sheets

FIG. I
PRIOR ART
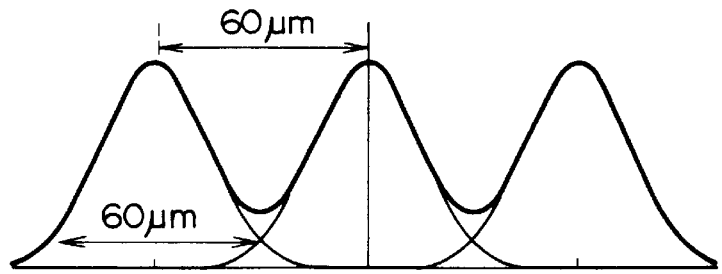
FIG. 2
PRIOR ART
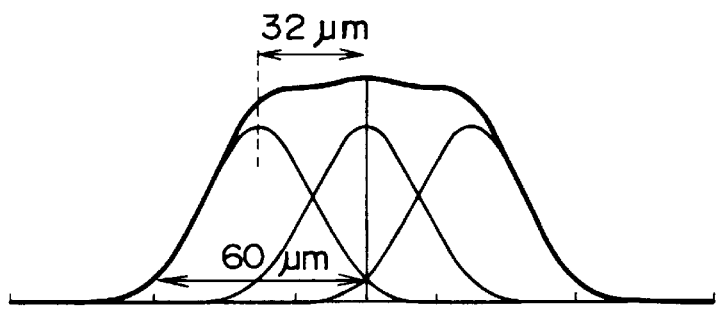
FIG. 3
PRIOR ART
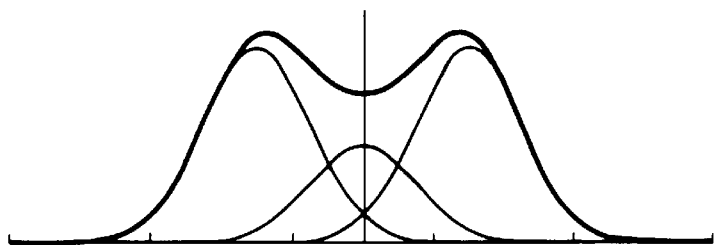

IMAGE FORMING DEVICE UTILIZING LASER BEAM

BACKGROUND OF THE INVENTION

1. Field of the Invention

This invention relates to an image forming device utilizing a laser beam.

2. Discussion of the Background

A laser printer is known which includes output means for outputting a laser beam having an intensity modulated according to an input data, a photosensitive recording medium, and an image forming optical system disposed to receive the laser beam from the output means for irradiating the laser beam on the recording medium, thereby to form an image constituted of dots on the recording medium.

Since the laser beam is a Gaussian beam having an intensity distribution nearly of a Gaussian distribution mode, it is necessary to provide an overlapping portion in each adjacent two dots in order to form a solid image. In this case, when the printing is performed, for example, with a dot size of 60 μm and a resolution of 400 dpi (scanning distance of about 60 μm), the beam intensity distribution on the recording medium is as shown in FIG. 1. Thus, an irregularity is caused in density of the solid image corresponding to the irregularity in the beam intensity. Jitters are also caused.

To cope with this problem, JP-A-58-152269 proposes a laser beam printer in which the overlapping portion of adjacent dots is increased to minimize the irregularity in intensity as shown in FIG. 2. While the above technique is effective to produce good solid images with uniform density, another problem is caused. Namely, when a pattern having high and low density is intended, the difference therebetween is unavoidably averaged and reduced as shown in FIG. 3. In other words, it is impossible to produce an image with density gradation faithful to the input data.

SUMMARY OF THE INVENTION

It is, therefore, an object of the present invention to provide a laser beam image forming device which can produce an image faithful to the input data.

It is a particular object of the present invention to provide a laser printer of the above-mentioned type which can produce uniform density solid images as well as clear images with density gradation.

In accomplishing the foregoing objects, there is provided in accordance with the present invention an image forming device comprising:

output means for outputting a Gaussian laser beam having an intensity modulated according to an input data, said laser beam having an intensity I at the center thereof and a beam radius $R_b$ which is a distance, on the plane normal to said laser beam, between said center and a point providing an intensity equal to $I/e^2$ where I is as defined above;

a photosensitive recording medium; and an image forming optical system disposed to receive said laser beam from said output means for irradiating said laser beam on said recording medium, thereby to form an image on said recording medium, said image forming optical system including an optical filter having such a laser beam filtering pattern that the optical transmittance is a minimum value M of 40–60% at a predetermined location thereof and gradually increases from said predetermined location in the radially outward direction in a Gaussian distribution mode, said filter having a filtering radius $R_f$ which is a distance between said predetermined location and a point on said filter providing a transmittance equal to $100-(100-M)/e^2\%$, said filtering radius $R_f$ being not smaller than $0.9\,R_b$ but not greater than $1.1\,R_b$.

BRIEF DESCRIPTION OF THE DRAWINGS

Other objects, features and advantages of the present invention will become apparent from the detailed description of the preferred embodiments which follows, when considered in light of the accompanying drawings, in which:

FIGS. 1–3 show laser beam intensity distribution patterns of known laser beam printers;

DETAILED DESCRIPTION OF THE PREFERRED EMBODIMENTS OF THE INVENTION

Figure 4:
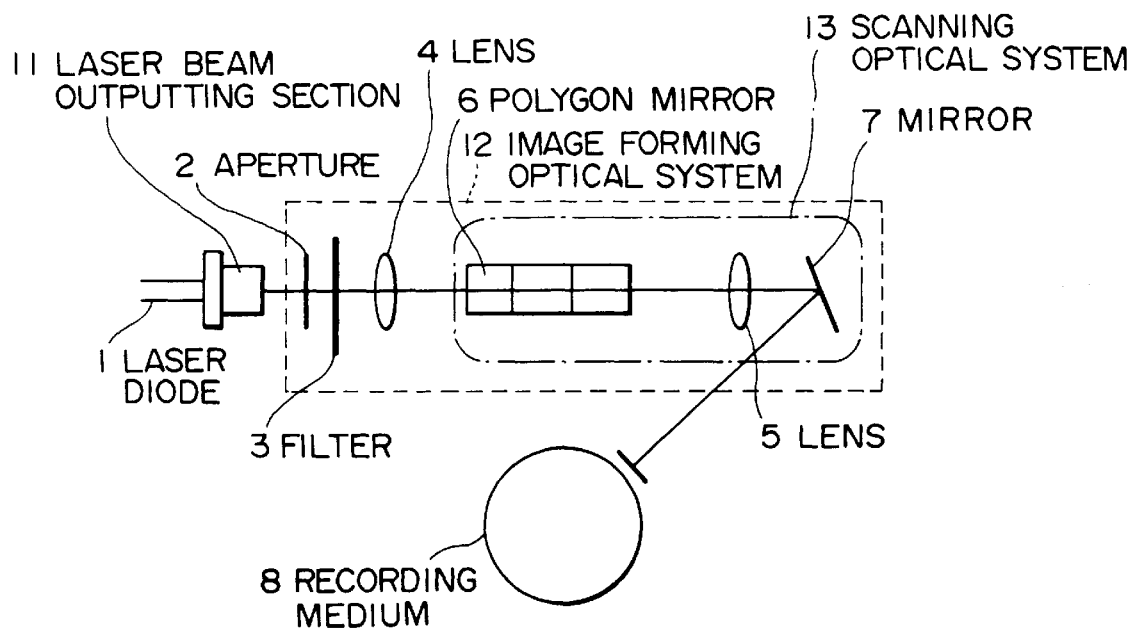
FIG. 4 is a schematic illustration showing a construction of a laser beam printer of an embodiment according to the present invention.

Referring now to FIG. 4, designated 11 is a modulated laser beam outputting section adapted to output a laser beam having an intensity modulated according to an input data. In the illustrated embodiment, the outputting section 11 includes a laser diode 1 having an input coupled with an input data source so that a laser beam having an intensity modulated according to an input data is generated from the diode 1. Alternatively, the outputting section 11 may be constructed from a combination of a laser diode with a modulator such that the intensity of the laser beam from the laser diode is modulated by the modulator according to an input data.

Figure 6:
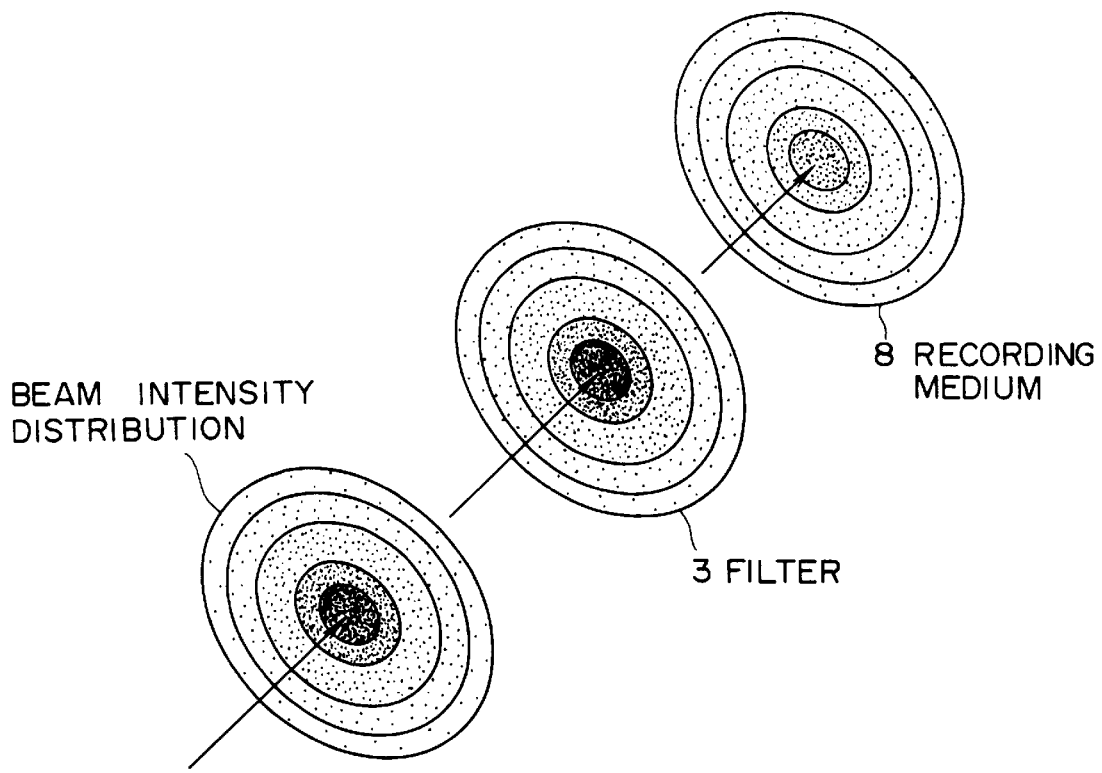
FIG. 6 is a schematic illustration showing the modifying of a laser beam intensity distribution by an optical filter.

The laser beam from the outputting section 11 has an intensity distributed in a Gaussian distribution mode as schematically illustrated in FIG. 6. Thus, the laser beam has an intensity I at the center thereof. On the plane normal to the incident direction of the laser beam, the intensity gradually decreases from the center in the radially outward direction in a Gaussian distribution mode. In this case, the beam radius $R_b$ of the laser beam is defined as a distance between the center and a point providing an intensity equal to $I/e^2$ (about 0.135I) where I is as defined above and e is a number of about 2.718.

Figure 5:
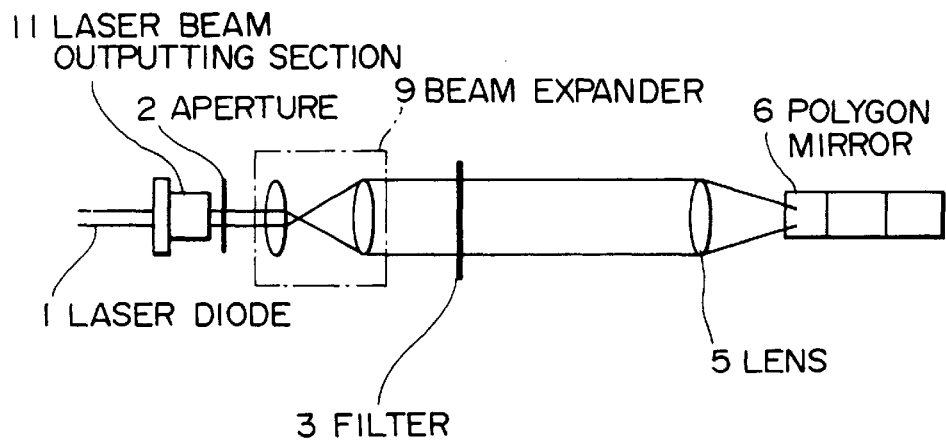
FIG. 5 is a schematic partial view showing a part of a construction of a laser beam printer of another embodiment according to the present invention.

An image forming optical system 12 is disposed adjacent to the outputting section 11 for directing the modulated laser beam from the outputting section 11 to a photosensitive recording medium 8 such as an electrophotographic recording medium in the form of a drum. Any conventionally known image forming optical system may be used for the purpose of the present invention. The image forming optical system 12 shown in FIG. 4 includes an aperture 2, a lens 4, a polygon mirror, a lens 5 and a scanning mirror 7. The polygon mirror 6, lens 5 and scanning mirror 7 constitute a scanning optical system 13. In the embodiment shown in FIG. 5, a beam expander 9 is disposed adjacent the aperture 2. As scanning, the recording medium 8 is exposed to the laser beam, so that a latent image is formed on the recording medium. The recording medium is suitably an electrophotographic photosensitive medium having a photosensitive layer. The photosensitive layer preferably has a thickness not greater than 30 μm to enhance the effect of the present invention.

The present invention is characterized in that a specific optical filter 3 is interposed in the optical path of the laser beam. The filter 3 is disposed between the aperture 2 and the lens 4 in the embodiments shown in FIG. 4 and between the beam expander 9 and the lens 5. The filter 3 has such a laser beam filtering pattern that the optical transmittance is a minimum value M % at a predetermined location thereof (e.g. the center of the filter) and gradually increases from the predetermined location in the radially outward direction in a Gaussian distribution mode. In this case, the filtering radius $R_f$ of the filter 3 is defined as a distance between the predetermined location and a point on the filter 3 providing a transmittance equal to $[100-(100-M)/e^2]\%$ (about $[100-0.135\times(100-M)]\%$) where M is as defined above.

In the present invention, the filtering radius $R_f$ of the filter 3 should be not smaller than 0.9 $R_b$ but not greater than 1.1 $R_b$. Preferably, $R_f$ is equal to $R_b$. The minimum value M is in the range of 40–60%, preferably about 50%.

Figure 7:
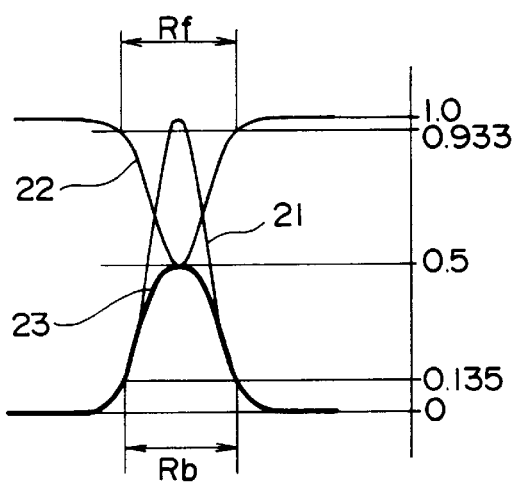
FIG. 7 shows distribution curves showing the modifying of a laser beam intensity distribution by an optical filter.

Thus, when the above optical filter 3 having the above filtering pattern is disposed in the optical path of the laser beam with the predetermined location of the filter 3 (e.g. the center of the filter 3) coinciding with the center of the laser beam, the intensity distribution of the laser beam is changed after the passage therethrough as shown in FIG. 6. More particularly, as shown in FIG. 7, the intensity distribution of a laser beam having a Gaussian intensity distribution as shown by a line 21 is changed as shown by a line 23 upon passage through the filter having a minimum transmittance value M of 50% and filtering pattern distribution as shown by a line 22.

Figure 8:
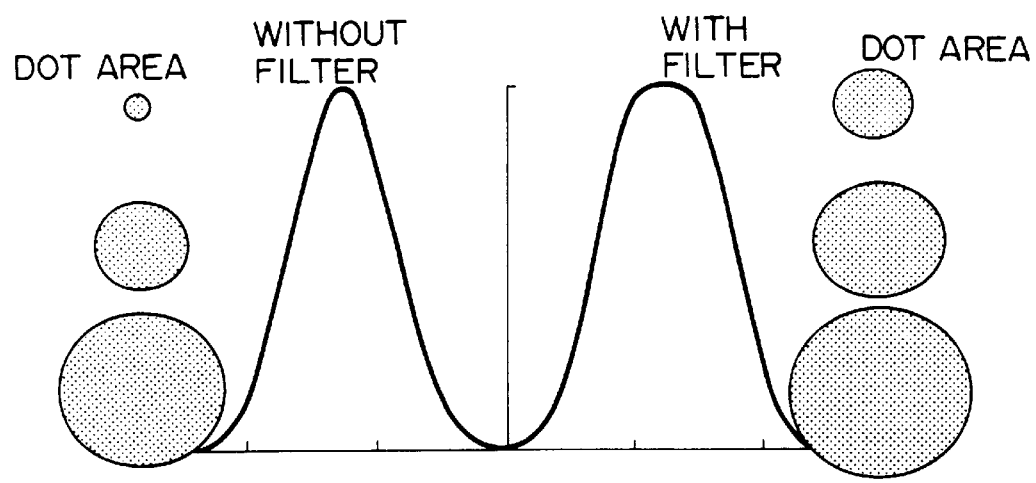
FIG. 8 is a diagram showing energy distribution curves of the present invention and the prior art.
Figure 9:
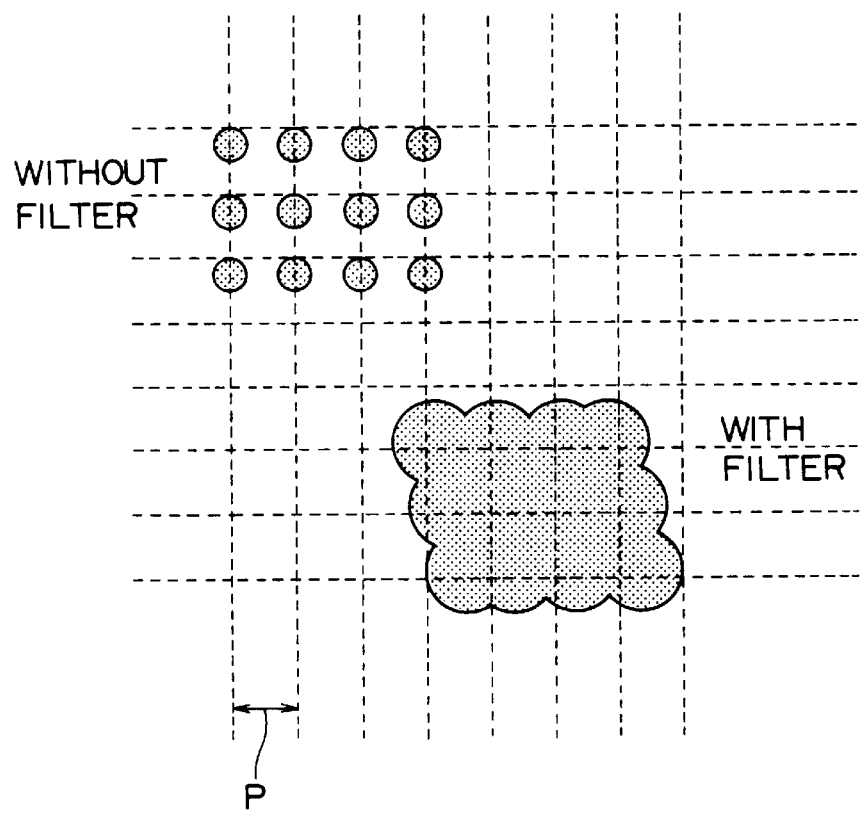
FIG. 9 is solid image patterns obtained by the laser beam of FIG. 8.

As a consequence of the modification of the intensity distribution of the laser beam by the optical filter 3 from the Gaussian mode to the broadened apex mode, the difference in dot area between high image density recording and low density recording in the case of the present invention is smaller than that between similar recording without using the filter 3, as appreciated from FIG. 8. Therefore, as illustrated in FIG. 9, the image forming device according to the present invention gives better solid images not only in high density recording but also in low density recording as compared with the case in which such a filter is not used.

Figure 10:
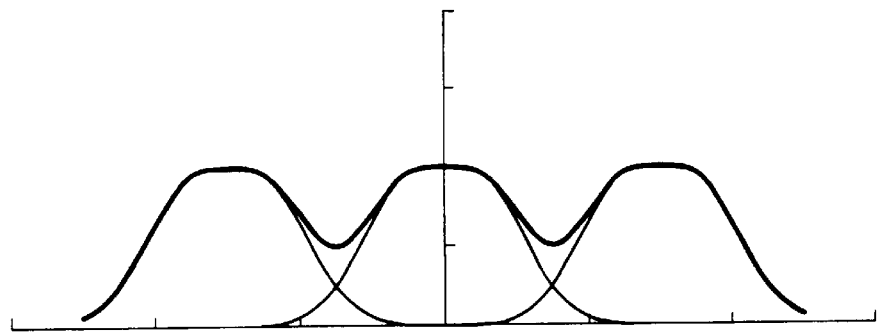
FIGS. 10–12 show laser beam intensity distribution patterns of the image forming device of the present invention.

When an image constituted of dot units is formed using a laser beam, whose intensity characteristics have been improved by the above-described optical filter, under the conditions similar to those in FIG. 1, the irregularity in the beam intensity is much reduced as shown in FIG. 10. Therefore, even with a large scanning line width, better solid images are obtainable and less jitters are caused with the image forming device according to the present invention as compared with the case where the above filter is not used.

Figure 11:
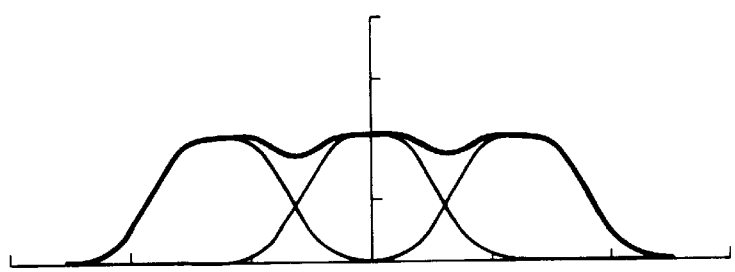
Figure 12:
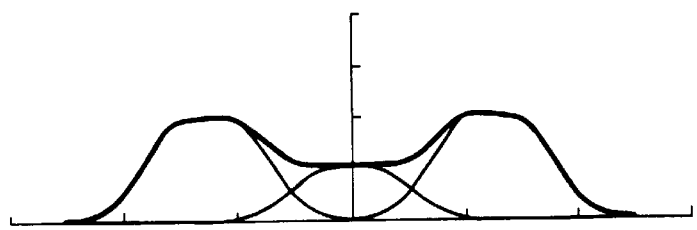

Especially when the scanning width P (distance between each adjacent two scanning lines) is adjusted to establish the relationship of P≦2 $R_b$<1.3 P, the intensity irregularity is minimized as shown in FIG. 11. In this case, in contrast with the case of FIG. 3, the difference in intensity between high density printing and low density printing is not averaged, as shown in FIG. 12. In other words, it is possible to produce clear half tone images.

The optical filter 3 may be disposed in any desired location in the image forming optical system 12. But it is preferable to position the filter 3 between the laser beam outputting section 11 and the scanning optical system 13 of the image forming optical system 12. It is also preferred that the beam expander 9 is interposed between the laser beam outputting section 11 and the filter 3, since the filter can be enlarged and, hence, produced without difficulty.

The optical filter 3 may be produced by any conventionally known technique. For example, a silver halide-type photosensitive material is irradiated with a laser beam having a Gaussian intensity distribution to obtain a negative pattern. By converting the negative pattern into a positive pattern, a film having the desired filtering pattern can be obtained. The filter 3 may also be produced by forming the desired pattern on a transparent substrate such as a film or a glass by a direct dying method, an electrodeposition method, a vacuum deposition method or any other suitable printing method.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. An image forming device comprising:

output means for outputting a Gaussian laser beam having an intensity modulated according to an input data, said laser beam having an intensity I at a center thereof and a beam radius $R_b$ which is a distance, on a plane normal to said laser beam, between said center and a point providing an intensity equal to $I/e^2$;

an electrophotographic photosensitive recording medium; and an image forming optical system disposed to receive said laser beam from said output means for irradiating said laser beam on said recording medium, thereby to form an image on said recording medium, said image forming optical system including an optical filter having such a laser beam filtering pattern that an optical transmittance is a minimum value M of 40–60% at a predetermined location thereof and gradually increases from said predetermined location in a radially outward direction in a Gaussian distribution mode, said filter having a filtering radius $R_f$ which is a distance between said predetermined location and a point on said filter providing a transmittance equal to $100-(100-M)/e^2\%$, said filtering radius $R_f$ being not smaller than 0.9 $R_b$ but not greater than 1.1 $R_b$.

2. An image forming device as claimed in claim 1, wherein said image forming optical system includes means for scanning said laser beam on said recording medium with a scanning distance of P between each adjacent two scanning lines, said scanning distance P and said beam radius $R_b$ having a relationship of P≦2 Rb≦1.3 P.

3. An image forming device as claimed in claim 1, wherein said electrophotographic photosensitive recording medium has a photosensitive layer with a thickness not greater than 30 μm.

4. An image forming device which outputs a Gaussian laser beam having an intensity modulated according to an input data, said laser beam having an intensity I at a center thereof and a beam radius $R_b$ which is a distance, on a plane normal to said laser beam, between said center and a point providing an intensity equal to $I/e^2$, said image forming device comprising:

an electrophotographic photosensitive recording medium; and an image forming optical system disposed to receive said laser beam to irradiate said laser beam on said recording medium to form an image on said recording medium, said image forming optical system including an optical filter having such a laser beam filtering pattern that an optical transmittance is a minimum value M of 40–60% at a predetermined location thereof and increases from said predetermined location in a radially outward direction in a Gaussian distribution mode, said filter having a filtering radius $R_f$ which is a distance between said predetermined location and a point on said filter providing a transmittance equal to $100-(100-M)/e^2\%$, said filtering radius $R_f$ being from 0.9 $R_b$ to 1.1 $R_b$.

5. An image forming device as claimed in claim 4, wherein said laser beam is scanned on said recording medium with a scanning distance of P between each adjacent two scanning lines, said scanning distance P and said beam radius $R_b$ having a relationship of $P \leq 2R_b \leq 1.3 P$.

6. An image forming device as claimed in claim 4, wherein said electrophotographic photosensitive recording medium has a photosensitive layer with a thickness not greater than 30 $\mu$m.

* * * * *